United States Patent [19]

Bömers

[11] 4,361,616

[45] Nov. 30, 1982

[54] LAMINATED BOARD

[75] Inventor: Joseph J. P. Bömers, Weert, Netherlands

[73] Assignee: Stamicarbon, B.V., Geleen, Netherlands

[21] Appl. No.: 124,903

[22] Filed: Feb. 26, 1980

[30] Foreign Application Priority Data

Mar. 1, 1979 [NL] Netherlands ............... 7901627
Jan. 12, 1980 [NL] Netherlands ............... 8000196

[51] Int. Cl.$^3$ ............... B32B 7/02; B32B 5/16
[52] U.S. Cl. ............... 428/215; 428/220; 428/241; 428/304.4; 428/312.2; 428/312.4; 428/315.7; 428/316.6; 428/317.9; 428/325; 428/327; 428/332; 428/404; 428/425.5; 428/454; 428/703
[58] Field of Search ............ 428/212, 241, 312, 315, 428/313, 425.5, 454, 446, 310, 325, 703, 327, 404, 332, 215, 220, 304.4, 312.2, 312.4, 315.7, 316.6, 317.9

[56] References Cited

U.S. PATENT DOCUMENTS

| 4,113,913 | 9/1978 | Smiley ............... 428/310 |
| 4,186,536 | 2/1980 | Piazza ............... 428/310 |
| 4,188,428 | 2/1980 | Wolf ............... 428/315 X |
| 4,205,111 | 5/1980 | Pip et al. ............... 428/315 X |

FOREIGN PATENT DOCUMENTS 937149  11/1973  Canada ............... 428/310

*Primary Examiner*—Thomas J. Herbert, Jr.

[57] ABSTRACT

Laminated board structures having excellent mechanical properties made up of a layer of thermal and/or acoustic insulating material strongly bonded to a layer of fibre-reinforced water hardened cement with an aqueous dispersion containing an addition polymer preferably containing acid groups and having an average particle size between 0.05 micron and 5 microns. Improved mortar composition used in the laminate structure.

14 Claims, No Drawings

LAMINATED BOARD

The invention relates to a laminated board, in particular to a building board, made up of a layer of thermal and/or acoustic insulant and of a layer of fiber-reinforced water-hardened cement.

Such boards, which are suitable for the construction of inexpensive houses, for instance in developing countries and tropical regions, but also of, for instance, holliday cottages, are known, inter alia, from the Netherlands patent application No. 7514263, the German Offenlegungsschrift No. 2 756 820, and from Plastics Technology of September 1977, pages 11f.

The boards described in the Netherlands patent application 7514263 consist of a layer of polyurethane foam enveloped by a glass fiber reinforced cement layer. These are manufactured by foam injection of a hollow boardshaped element of glass fiber reinforced cement. This manufacture is complicated and therefore expensive. The element must further be supported during the foaming of the polyurethane to prevent permanent deformation.

The boards described in the German Offenlegungsschrift No. 2 765 820 also consist of a layer of polyurethane foam enveloped by a glass fiber reinforced cement layer. The method of manufacture, however, is different. First a thin layer of glass fiber reinforced cement mortar is put in a mold. On top a hard polyurethane foam sheet is laid, and the mould is subsequently filled up further with glass fibers reinforced cement mortar. The mould is vibrated and the mortar is then allowed to harden. Besides non-oriented glass fibres, glass fibre mats may also be applied round the foam layer. After hardening of the mortar, the whole is taken from the mold. Plastics Technology further contains a description to the effect that the glass fiber reinforced cement layer is applied round a pre-foamed sheet.

The disadvantage of all these boards is that the bond between the glass fiber reinforced cement layer and the foam layer is not sufficiently strong. This means that the mechanical properties, such as buckling strength, load bearing strength and impact resistance of such boards is not, or hardly, better than those of the cement layer alone. To remove these disadvantages a proper bond is required between the insulating layer and the glass fiber reinforced cement layer. Further, it has appeared that, under a pressure load, such boards will show strong deformation and will even crumble away, which occurs particularly with large boards, e.g. larger than 1 m, in the direction of the pressure load. Moreover, when a fiber reinforced cement layer is applied to an already hardened polyurethane foam layer, the bond will be less good, as stated already in the Netherlands patent application No. 7514263, page 3, lines 23f, and page 10, lines 2f.

The aim of the invention is to provide a board as mentioned in the preamble which does not have the disadvantages stated and in which a very good bond is obtained between the insulating layer and the fiber reinforced cement layer.

According to the invention this is achieved if the layer of insulating material is bonded to the layer of fiber-reinforced water-hardened cement by means of an aqueous plastic dispersion containing an addition polymer of an average particle size which is between 0.05 and $5\mu$. The addition polymer preferably contains acid groups. In the hardening mass in the layer of fiber-reinforced water-hardened cement a water/cement ratio is applied which is preferably between 0.2 and 0.5. It is advantageous to incorporate the plastic dispersion in at least that part of the cement layer that is in contact with the insulating layer. Another possibility is to incorporate the plastic dispersion in the layer of fiber-reinforced water-hardened cement. The weight ratio of resin to cement is preferably between 0.02 and 0.4.

As fiber material, mineral fibers can be used, such as glass fibres, glass wool, rock wool, but also fibres from organic polymers such as for instance continuous networks of fibrillated polypropylene film.

The board obtained according to the invention shows excellent buckling strength, load bearing strength and impact resistance, which even increase with time. Another advantage of the board according to the invention is that the layer of insulating material increases the strength of the board, in contrast with the boards mentioned in the preamble.

The insulant may be a light or a heavy material, with the heavy material, such as e.g. gypsum, being used mainly for acoustic insulation. Preference, however, is given to the use of a light material, such as foam, which is voluminous and contains much air, and has a small specific mass.

Foam may be understood to mean foamed gypsum, glass wool, rock wool, foam concrete, hollow gypsum sections with large cells or ducts, PVC foam, polystyrene foam, polyurethane foam, polyethylene foam. The specific mass of these materials is $<2$, preferably $<0.5$. Thus, boards can be obtained that are light in weight and yet have great strength. Even with foams from non-polar polymers, which are preferably applied, such as polystyrene and polyethylene, good bonding and consequently good mechanical properties can be obtained. The thermal and/or acoustic insulant can be enveloped on one flat side, on both flat sides or even on all sides with a layer of fiber-reinforced cement.

In order to obtain a good distribution of the fiber-reinforced cement during its application on the layer of thermal and/or acoustic insulant, a substance imparting thixotropy can be added to the fiber reinforced cement in a quantity up to 0.1% by volume, e.g. methyl cellulose. This is particularly important if the fibre-reinforced cement is applied by spraying or blowing, with one or more sides in vertical position.

The mortars which are preferably applied prove to be excellently workable despite the relatively low water cement factor and the acid groups present in the plastic dispersion. A special advantage is that since a resin dispersion of a polymer containing acid groups is incorporated in the cement reinforced with ordinary E glass fiber, there is no longer any decline of the mechanical properties, which decline is possibly caused by the alkaline attack of the fibres.

Preference is given to polymer resins prepared from monomers containing vinyl groups. The polymer resins preferably contain acid groups such as phosphoric acid or sulphonic acid groups, and, very specifically, carboxyl groups. These carboxyl groups may stem from built-in mono-unsaturated acids such as acrylic acid, methacrylic acid, fumaric acid, itaconic acid, crotonic acid or semi-esters of maleic acid, fumaric acid or itaconic acid; they may also have been applied to the polymer by grafting. They may, furthermore, be formed by modification, specifically oxidation or saponification of certain polymers. Preference, however, is given to carboxyl groups from mono-unsaturated monomers containing one or more carboxyl groups and polymerized into the polymer resin. In order to achieve optimum results these monomers are preferably incorporated in a quantity of 2.5 to 30% by weight in relation to the polymer. Very good results are obtained if the concentration of unsaturated monomer containing carboxyl groups is 5 to 25% by weight, particularly 10 to 20% by weight.

For the rest the polymers consist of vinyl monomers such as styrene, α-methyl styrene, vinyl chloride, cyclohexyl methacrylate, acrylonitrile, vinyl acetate, vinylversatate, methyl methacrylate, ethyl, butyl and hexyl acrylate, dibutyl fumarate, or dibutyl maleate, methyl vinyl ether, ethylene and propylene.

For the achievement of optimum properties it is desirable that the water-cement factor will be chosen beween 0.2 and 0.4.

A special advantage is the possibility of effecting rapid hardening by applying elevated temperatures. In consequence the strength will increase with time. Furthermore, the surface of the hardened layer is free of cracks. These properties are all the more remarkable, because in non-modified fiber-reinforced cement the bending strength and the crack formation are adversely effected by accelerated hardening. Furthermore, the hardening conditions, particularly the relative humidity, are very critical for this unmodified cement. It is, therefore, particularly advantageous, in applying the method according to the invention, to effect hardening, at least in part, at a temperature between 35° and 100° C., in particular between 50° and 95° C. The humidity is then little critical, but is preferably between 40 and 80%.

The average particle size of the applied dispersion is preferably between 0.05 and 1.5μ, specifically between 0.1 and 0.75μ.

The cement mortar which is applied may contain up to 40% by volume of fillers, such as sand, however preferably of a maximum grain diameter of about 500 microns.

It is also possible to apply the fibers in the form of fiber mats. These mats will then be impregnated with cement mortar in which a resin dispersion containing acid groups has been incorporated.

The quantity of synthetic mineral fibers present, particularly glass fibers, is not critical and is about 40% by volume at most, preferably however up to 10% by volume and, particularly, 5 to 10% by volume. The fiber length is not critical either but is, as a rule, 1 to 5 cm.

The fiber-reinforced cement can be applied in many ways, for instance by blowing on cement mortar with fibers, or by applying a mortar-impregnated mat of fibers, or otherwise. The most suitable boards can be formed by combining a fiber-reinforced cement layer of 1-50 mm, preferably 16 mm, with an insulating layer of a thickness of 10-500 mm.

The manufacture of the boards according to the invention can be done continuously, viz. by continuously supplying continuously manufactured insulating board, or by placing separate insulating boards one behind the other.

The boards according to the invention are suitable for many purposes, such as for load-bearing external walls and partitions, floors for dwellings and buildings, wall elements, boats, swimming pools, storage tanks and other constructional uses.

EXAMPLE 1

An insulating board of polystyrene foam, thickness 5 cm, length 240 cm and width 60 cm, was provided on all sides with a cement mortar consisting of:

| Portland cement | 1 part by weight |
| --- | --- |
| polymer dispersion | 0.3 |
| sand | 20% by weight in relation to cement |
| defoamer | 0.01% by volume |
| methyl cellulose | 0.01% by volume. |

To this mortar, water had been added, so that the water/cement factor of the mortar was 0.35. The polymer dispersion, consisting of a copolymer of 10% by volume of methacrylic acid, 50% by volume of styrene and 40% by volume of butyl acrylate, dispersed in water, had an average particle size of 0.5μ and a solids content of 50% by weight. After application of the mortar to the board of polystyrene foam, glass mats consisting of E-glass fibers were rolled in the mortar, so that after drying a layer thickness of 0.3 cm was obtained with a glass fibre content of 7% by volume. After hardening of the resulting panel for 28 days at 20° C. and at a relative humidity of 65%, the panel as subjected to pressure tests, after having been sawn through across its width so that the length was 120 cm. For comparison, identical elements were tested in which no polymer dispersion had been incorporated.

The test results are given in the following table:

| Max. load | |
| --- | --- |
| Panel according to invention | Panel without polymer dispersion |
| 7200 kg | 4350 kg |

The max. load was determined at the moment when the deformation and/or crumbling of the material were so serious that the test could not be continued. The pressure/buckling strength was therefore greater than the values stated here.

In order to suppress crumbling, a test was made with panels of a much smaller height, viz. 30 cm (same width and thickness, respectively 60 and 5 cm).

The test results are given in the following table:

| Max. load | |
| --- | --- |
| Panel according to invention | Panel without polymer dispersion |
| 12300 kg | 10500 kg |

At this load of 12300 kg, fracture occurred, and the test of the panel without polymer dispersion had to be discontinued on account of serious deformation and crumbling of the material. These results show that the deformation and/or crumbling are a far greater problem than just fracture. Particularly with panels of customary dimensions it appears that the invention provides a solution for these problems.

EXAMPLE 2

An insulating board of polystyrene foam, thickness 5 cm, length 240 cm and width 60 cm, was sprayed on all sides with a mixture again consisting of Portland cement, sand, polymer dispersion (solids content 50%), defoamer and methyl cellulose, all of them in the same quantities as in example 1.

The average particle size of the polymer dispersion was again 0.5μ. The mortar contained 7.5% by volume of normal glass fiber. The water/cement factor of the mortar was again 0.35. The thickness of the glass fiber reinforced cement layer applied was 0.5 cm. During testing under pressure equivalent results were obtained.

I claim:

1. An insulating board laminate panel structure having a combination of a fiber reinforced water-hardened cement mortar layer securely bonded to an insulating foam material so that high bond strength between said insulating board and said cement mortar layer is achieved and said resulting laminate panel has higher buckling strength, load bearing and impact resistance, wherein said panel structure is composed of:
   (A) said insulating board foam material having a density of less than about 0.5 grams/cc; and
   (B) said water-hardened cement mortar layer adjacent said insulating board material has a composition consisting essentially of:
      (i) cement mortar having a weight ratio of water to said cement mortar between 0.2 to 0.5, and further having up to 40 percent by volume of reinforcing fibers; and
      (ii) a dispersion of an addition-polymerized resin of vinyl monomers having an average particle size of between 0.05 to 1.5 microns, said resin being present in a resin to said cement weight ratio of between 0.02 to 0.4 and containing between 2.5% to 30.0% by weight of monomers having an acid group.

2. Laminate panel structure according to claim 1, wherein said acid group is selected from the group consisting of phosphoric acid groups, sulfonic acid groups and carboxyl groups.

3. Laminate panel structure according to claim 1, wherein said cement includes up to 0.1 percent by volume of a thixotropy imparting substance.

4. Laminate panel structure according to claim 1 wherein said laminate structure hardens at a temperature between 35° C. and 100° C.

5. Laminate panel structure according to claim 1, wherein said cement layer completely envelopes said insulating material.

6. Laminate panel structure according to claim 1 or 5, wherein said cement layer is from 1 mm to 50 mm thick and said insulating material is from 10 mm to 500 mm thick.

7. Laminated structure according to claim 1, wherein said reinforcing fibers are polymer fibers.

8. Laminated panel structure according to claim 7, wherein said polymer fibers in said cement are in the form of continuous networks.

9. Laminate panel structure according to claim 1, wherein said acid group is a monounsaturated acid selected from the group consisting of acrylic acid, methacrylic acid, fumaric acid, itaconic acid, crotonic acid or semiesters of malic acid, fumaric acid or itaconic acid.

10. Laminate panel structure according to claim 9, wherein said mono-unsaturated acids are monomers having at least one carboxyl group wherein said monomers are polymerized into said resin.

11. Laminate panel structure according to claim 9 or 10, wherein said particle size is between 0.1 micron and 0.75 microns.

12. Laminate panel structure according to claim 1, wherein said fibers are mineral fibers.

13. Laminate panel structure according to claim 12, wherein said mineral fibers are present in amounts between 1% and 20%.

14. Laminate panel structure according to claim 12 or 13, wherein said mineral fibers are glass fibers.

* * * * *